United States Patent [19]

Fischer et al.

[11] Patent Number: 5,344,877
[45] Date of Patent: Sep. 6, 1994

[54] MOLDING MATERIAL FROM A PARTICULATE GRAFT POLYMER

[75] Inventors: Wolfgang Fischer, Ludwigshafen; Norbert Guentherberg, Speyer; Norbert Niessner, Friedelsheim; Karl Ruppmich, Ludwigshafen; Friedrich Seitz, Friedelsheim, all of Fed. Rep. of Germany

[73] Assignee: BASF Aktiengesellschaft, Ludwigshafen, Fed. Rep. of Germany

[21] Appl. No.: 60,976

[22] Filed: May 14, 1993

[30] Foreign Application Priority Data

May 19, 1992 [DE] Fed. Rep. of Germany ....... 4216549

[51] Int. Cl.$^5$ .............................................. C08L 51/04
[52] U.S. Cl. .................................... 525/83; 525/80; 525/85; 525/301; 525/309; 525/310
[58] Field of Search ............... 525/80, 301, 309, 310, 525/83, 85

[56] References Cited

U.S. PATENT DOCUMENTS

| | | | |
|---|---|---|---|
| 3,632,683 | 1/1972 | Cusano | 260/880 |
| 4,612,347 | 9/1986 | Eichenauer et al. | |
| 4,668,737 | 5/1987 | Eichenauer et al. | |
| 5,252,666 | 10/1993 | Seitz et al. | 525/80 |

FOREIGN PATENT DOCUMENTS 450511 10/1991 European Pat. Off. .
4011163 10/1991 Fed. Rep. of Germany .

*Primary Examiner*—Vasu S. Jagannathan
*Attorney, Agent, or Firm*—Keil & Weinkauf

[57] ABSTRACT

A molding material from a particulate graft polymer which consists of
  A: a grafting base A based on an acrylate rubber and
  B: a graft B of
    B1: from 40 to 89.9% by weight of at least one vinylaromatic monomer B1
    B2: from 10 to 49.9% by weight of at least one polar, copolymerizable, ethylenically unsaturated monomer B2
    B3: from 0.1 to 20% by weight of at least one monomer B3 containing one or more acidic groups.

2 Claims, No Drawings

MOLDING MATERIAL FROM A PARTICULATE GRAFT POLYMER

The present invention relates to particulate graft polymers which are suitable as a flexible component for dull thermoplastic molding materials having improved toughness.

It is known (DE-A 34 21 353) that both acidic and basic monomers can be incorporated simultaneously into the graft of a graft rubber. DE 34 05 938 describes the use of graft polymers having acidic functions in thermoplastics having basic functions. DE 40 11 163 describes the use of an acidic monomer in the core and the simultaneous use of a base in the graft. However, dull molding materials have not been satisfactorily produced using the above proposals and data. We have found graft copolymers which impart improved toughness to the molding materials produced therewith, by providing a rubber component which contains basic monomers in the base rubber and acidic monomers in the graft rubber.

The present invention relates to a particulate graft polymer of

A: a grafting base A based on an acrylate rubber A1 consisting of
  A11: from 75 to 99.8% by weight of at least one alkyl acrylate A11 where the alkyl radical is of 1 to 8 carbon atoms
  A12: from 0.1 to 5% by weight of at least one polyfunctional crosslinking monomer A12
  A13: from 0.1 to 20% by weight of at least one monomer A13 containing one or more basic groups or based on a diene rubber A2 consisting of
  A21: at least 50% by weight of one or more dienes A21
  A22: up to 50% by weight of at least one copolymerizable ethylenically unsaturated monomer A22
  A23: from 0.1 to 15% by weight of at least one monomer A23 containing one or more basic groups and
B: a graft B of
  B1: from 40 to 89.9% by weight of at least one vinylaromatic monomer B1
  B2: from 10 to 49.9% by weight of at least one polar, copolymerizable, ethylenically unsaturated monomer B2
  B3: from 0.1 to 20% by weight of at least one monomer B3 containing one or more acidic groups.

The present invention furthermore relates to a thermoplastic molding material consisting essentially of from 1 to 50% by weight of the particulate graft polymer described above and from 50 to 99% by weight of at least one polymer having a glass transition temperature of more than 25° C. as a matrix and minor amounts of conventional additives and assistants.

The present invention thus relates to particulate graft polymers having the above composition depending on the preparation, and to thermoplastic molding materials prepared using such graft polymers. The following may be stated specifically about the novel particulate graft copolymers, their components and their preparation:
The particulate graft polymers are obtained from a grafting base (rubber) A and a graft B in a conventional manner. Either a crosslinked acrylate polymer A1 or a diene copolymer A2 having a glass transition temperature below 0° C., preferably below −20° C., is used as rubber A.

Suitable monomers A11 are acrylates where the alkyl radical is of 1 to 8 carbon atoms and at least in some cases those where the alkyl radical is of 4 to 8 carbon atoms. n-Butyl acrylate and ethylhexyl acrylate are particularly suitable. The acrylates can be used alone or as a mixture with one another.

In order to achieve good mechanical properties, it has proven necessary for the acrylate polymer used as the grafting base to be crosslinked. For this purpose, the polymerization of the acrylates is carried out in the presence of from 0.1 to 5% by weight, based on the total weight of the monomers used in the preparation of the grafting base, of a copolymerizable, polyfunctional monomer A12 which affects crosslinking. Monomers which contain at least two ethylenic double bonds which are capable of copolymerization and are not conjugated in the 1,3-position are suitable. Examples are divinylbenzene, diallyl maleate, diallyl fumarate, diallyl phthalate, allyl methacrylate, triallyl cyanurate or triallyl isocyanurate. The acrylate of tricyclododecenyl alcohol has proven a particularly advantageous crosslinking monomer (cf. German Patent 1,260,135).

Suitable monomers A21 are butadiene, isoprene and derivatives thereof as well as hexadiene and chloroprene.

To improve the binding of the graft to the grafting base, the monomer mixture used for the preparation of the grafting base furthermore contains from 0.1 to 20% by weight of one or more copolymerizable monomers which contain one or more basic groups (A13) or (A23). Preferred monomers contain a tertiary amino group in the molecule. Examples of these are dimethylaminoethyl (meth)acrylate, morpholine methacrylate, N-vinylimidazole, p-dimethylaminostyrene, N-vinylcarbazole, 3-vinylpyridine, 4-vinylpyridine and mixtures thereof. Particularly preferred monomers are esters of acrylic acid or methacrylic acid with aliphatic alcohols which contain a tertiary amino group in the alkyl radical.

The method described in German Patent 1,260,135 can be used for the preparation of the graft copolymer. For this purpose, the grafting base A is first prepared; if the grafting base is to be an acrylate rubber, the acrylate or acrylates A11, the polyfunctional monomer A12 and the novel basic monomer A13 are polymerized in aqueous emulsion at from 20° to 100° C., preferably from 50° to 80° C. The conventional emulsifiers, such as the alkali metal salts of alkyl- or alkylarylsulfonic acids, alkylsulfates, fatty alcohol sulfonates, salts of higher fatty acids of 10 to 30 carbon atoms or resin soaps, may be used. The sodium salts of alkylsulfonates or of fatty acids of 10 to 18 carbon atoms are preferably employed. It is advantageous to use emulsifiers in an amount of from 0.5 to 5, in particular from 1 to 2%, by weight, based on the total weight of the monomers used for the preparation of the grafting base. In general, a water/monomer ratio of from 2:1 to 0.7:1 is employed. The polymerization initiators used are in particular conventional persulfates, for example potassium peroxodisulfate, but redox systems are also suitable. The amount of initiators (eg. from 0.1 to 1% by weight, based on the total weight of the monomers) depends in a known manner on the desired molecular weight.

The conventional buffer substances by means of which a pH of, preferably, from 6 to 9 is obtained, for example sodium bicarbonate and sodium pyrophosphate, and up to 3% by weight of a molecular weight regulator, such as a mercaptan, a terpinol or dimeric alpha-methylstyrene, can be used as polymerization assistants.

The exact polymerization conditions, in particular the type, dose and amount of emulsifier, are determined within the abovementioned ranges so that the resulting latex of crosslinked acrylate polymer has a $d_{50}$ value of from about 30 to 1,000 nm, preferably from 50 to 800 nm.

If the core is to be a diene rubber, the following procedure is advantageously adopted:

The elastomer, the grafting base A, is prepared by polymerizing A21 alone or if necessary together with the further comonomers A22 and A23 in aqueous emulsion in a conventional manner at from 20° to 100° C. preferably from 50° to 80° C. Conventional emulsifiers, such as alkali metal salts of alkyl- or alkylarylsulfonic acids, alkylsulfates, fatty alcohol sulfonates, salts of higher fatty acids of 10 to 30 carbon atoms or resin soaps, may be used. Sodium or potassium salts of alkylsulfonates or fatty acids of 10 to 18 carbon atoms are preferably employed. It is advantageous to use the emulsifiers in amounts of from 0.5 to 5, in particular from 0.5 to 2%, by weight, based on the monomers used in the preparation of the grafting base A. In general, a water/monomer ratio of from 2 : 1 to 0.7 : 1 is employed. In particular, the conventional persulfates, such as potassium persulfate, are used as polymerization initiators, but redox systems may also be employed. Initiators are used in general in amounts of from 0.1 to 1% by weight, based on the monomers used in the preparation of the grafting base A. Conventional buffer substances by means of which a pH of, preferably, from 6 to 9 is obtained, for example sodium bicarbonate and sodium pyrophosphates, can be used as further polymerization assistants; furthermore, in general from 0.1 to 3% by weight of a molecular weight regulator, such as a mercaptan, a terpinol or dimeric alpha-methylstyrene, may be used in the polymerization.

The exact polymerization conditions, in particular the type, dose and amount of the emulsifier, are chosen specifically within the abovementioned ranges so that the resulting latex of the polymer A has a $d_{50}$ value of from about 100 to 750 nm, preferably from 100 to 600 nm. Alternatively, however, the emulsion polymer is agglomerated in a known manner to give median particle sizes of from 60 to 150 nm (cf. German Published Application DAS 2,427,960).

Graft B:

For the preparation of the graft copolymer comprising a core and graft, a monomer mixture of from 40 to 89.9% by weight of at least one vinylaromatic monomer B1, from 10 to 49.9% by weight of at least one polar, copolymerizable monomer B2 and from 0.1 to 20% by weight of at least one acidic monomer B3 is polymerized in the presence of the resulting latex A. Examples of vinylaromatic monomers are styrene, alpha-methylstyrene and styrenes alkylated in the nucleus, such as p-methylstyrene and tert-butylstyrene. Styrene, alphamethyistyrene and p-methylstyrene are particularly preferably used. Examples of polar, copolymerizable monoethylenically unsaturated monomers B2 are acrylonitrile, methacrylonitrile and alkyl acrylates and methacrylates where the alkyl radical is of 1 to 4 carbon atoms. Acrylonitrile, methyl methacrylate and mixtures thereof are preferred. Suitable monomers B3 are monomers copolymerizable with B1 and B2 and having acidic groups. Particularly suitable acidic groups are carboxyl or sulfo groups. Preferred acidic monomers B3 are $\alpha,\beta$-unsaturated carboxylic acids, such as acrylic acid or methacrylic acid, as well as citraconic acid, crotonic acid; fumaric acid, itaconic acid, maleic acid, vinylsulfonic acid, vinylbenzenesulfonic acid, vinylphosphoric acid or cinnamic acid.

It is advantageous to carry out the graft copolymerization onto the polymer serving as the grafting base A once again in aqueous emulsion. It may be effected in the same system as the polymerization of the grafting base, and further emulsifier and initiator may be added. These need not be identical to the initiators and emulsifiers used for the preparation of the grafting base A. For example, it may be advantageous to use a persulfate as the initiator for the preparation of the grafting base A but to employ a redox initiator system for the polymerization of the graft B. Otherwise, the statements made in connection with the preparation of the grafting base A are applicable to the choice of emulsifier, initiator and polymerization assistants. The monomer mixture to be grafted on can be added to the reaction mixture all at once, batchwise in a plurality of stages or, preferably, continuously during the polymerization. The graft copolymerization is controlled so that a degree of grafting of from 10 to 60% by weight, preferably from 15 to 45%, by weight results.

The novel particulate graft polymers can be used by themselves as molding materials. For this purpose, they can be worked up, for example, by spray drying. However, the particulate graft polymers are preferably used for mixing with a thermoplastic in order to increase its impact strength. Thermoplastics suitable for modification have glass transition temperatures above 25° C., preferably above 60° C. They are also referred to below as a rigid component (matrix). Examples of suitable rigid components are polyvinyl chloride, polymethyl methacrylate and in particular copolymers of a vinylaromatic monomer and a polar, copolymerizable, ethylenically unsaturated monomer. Here too, suitable vinylaromatic and polar, copolymerizable, ethylenically unsaturated monomers are those stated as B1 and B2 for the preparation of the graft. Particularly preferred rigid components are styrene/acrylonitrile and $\alpha$-methylstyrene/acrylonitrile copolymers. The novel particulate graft polymers can be incorporated, for example, by isolating the particulate graft polymer from the emulsion by adding an electrolyte and, if necessary after drying, then mixing it with the rigid component by extruding, kneading or roll-milling the components together.

The novel thermoplastic molding materials may contain, as further components, additives as usually employed for thermoplastic molding materials. Examples of these are fillers, further, compatible plastics, antistatic agents, antioxidants, flameproofing agents, lubricants, dyes and pigments. The additives are used in conventional amounts, preferably in amounts of up to 30% by weight, based on the total weight of the thermoplastic molding materials. Compatible plastics may also be used in a larger amount.

The novel materials can be converted into the various moldings, for example window profiles, garden furniture, boats, signs, lamp shades, automotive parts and children's toys, by the methods usually used for processing thermoplastics, for example extrusion and injection molding. The novel materials are particularly suitable for the production of moldings where high impact strength is required.

In the Examples which follow, parts and percentages are by weight, unless stated otherwise.

EXAMPLES

1. Preparation of the grafting base A

The particular acrylate-based grafting base (A11, A12, A13) was prepared by the following general method: 160 g of the monomer mixture stated in Table 1 for the preparation of the grafting base A were heated to 60° C. in 1,500 g of water with the addition of 5 g of sodium salt of a $C_{12}$–$C_{18}$-paraffinsulfonic acid, 3 g of potassium peroxodisulfate, 3 g of sodium bicarbonate and 1.5 g of sodium pyrophosphate, while stirring. 10 minutes after initiation of the polymerization reaction, a further 840 g of the mixture stated in Table 1 were added in the course of 3 hours. After the end of the monomer addition, the emulsion was kept at 60° C. for a further hour.

2. Preparation of the particulate graft polymers (graft B)

2,100 g of the emulsion prepared by the above method (1) were mixed with 1,150 g of water and 2.7 g of potassium peroxodisulfate and heated to 65° C. while stirring. After the reaction temperature had been reached, 560 g of the monomer mixture stated in Table 1 for the preparation of graft B were metered in over 3 hours. After the end of the addition, the emulsion was kept at 65° C. for a further hour. The graft polymer was precipitated from the emulsion by means of calcium chloride solution at 95° C., washed with water and dried in a warm air stream.

For a diene-based grafting base (A21, A22, A23), for example, the following procedure is adopted:

A polybutadiene latex was prepared at 65° C. by polymerizing 600 g of butadiene in the presence of a solution of 6 g of tert-dodecyl mercaptan, 6 g of dimethylaminoethyl acrylate, 7 g of an Na $C_{14}$-alkylsulfonate as an emulsifier, 2 g of potassium peroxodisulfate and 2 g of sodium pyrophosphate in 800 ml of water. The conversion was 98%. A latex whose median particle size was 100 nm was obtained. The resulting latex was agglomerated by adding 25 g of emulsion of a copolymer of 96 parts of ethyl acrylate and 4 parts of methacrylamide having a solids content of 10% by weight, a polybutadiene latex having a median particle size of 350 nm being formed.

After the addition of 400 g of water, 4 g of an Na $C_{14}$-alkylsulfonate and 2 g of potassium peroxodisulfate, 400 g of a mixture of styrene and acrylonitrile and of the acidic component B3 in the ratio stated in Table 2 were added in the course of 4 hours. The polymerization was carried out while stirring the batch at 75° C. The conversion was virtually quantitative, based on styrene/acrylonitrile. The graft rubber dispersion obtained was precipitated by means of magnesium sulfate solution and the graft copolymer isolated was washed with distilled water and dried.

3. Mixing with rigid component

For the preparation of the blends, a styrene/acrylonitrile copolymer having an acrylonitrile content of 35% and an intrinsic viscosity of 80 ml/g was used as the rigid component. The precipitated and dried graft copolymer from (2) was mixed with the rigid component in an extruder at 260° C. in a manner such that the resulting mixture contained 50 or 46% of graft polymer. Moldings were produced from this blend by injection molding.

TABLE 1

| Grafting base A[1] | | | Graft B[2] | | | Notched impact strength [kJ/m$^2$] | Gloss[3] |
|---|---|---|---|---|---|---|---|
| BA | DCPA | DMAEA | S | AN | MAA | | |
| 1 | 97 | 2 | 1 | 74 | 25 | 1 | 23 | 8 |
| 2 | 96 | 2 | 2 | 73 | 25 | 2 | 25 | 5 |
| 3[4] | 98 | 2 | — | 75 | 25 | — | 10 | 72 |

[1]Composition of the monomer mixture used for the preparation of the grafting base A
[2]Composition of the monomer mixture used for the preparation of the grafting base B
[3]45° gloss
[4]Comparative Experiment correspondng to the prior art
BA = Butl acrylate
DCPA = Acrylate of tricyclododecenyl alcohol
DMAEA = Dimethylaminoethyl acrylate
S = Styrene
AN = Acrylonitrile
MAA = Methacrylic acid

TABLE 2

| Grafting base A[1] | | Graft B[2] | | | Notched impact strength [kJ/m$^2$] | Gloss[3] |
|---|---|---|---|---|---|---|
| BU | DMAEA | S | AN | MAA | | |
| 1[4] | 100 | — | 70 | 30 | — | 18 | 62 |
| 2 | 99 | 1 | 69 | 30 | 1 | 22 | 12 |
| 3 | 99 | 1 | 68 | 30 | 2 | 26 | 10 |

[1]Composition of the monomer mixture used for the preparation of the grafting base A
[2]Composition of the monomer mixture used for the preparation of the grafting base B
[3]45° gloss
[4]Comparative Experiment correspondng to the prior art
BU = Butadiene
DMAEA = Dimethylaminoethyl acrylate
S = Styrene
AN = Acrylonitrile
MAA = Methacrylic acid

We claim:
1. A molding material consisting essentially of
(i) from 1–50% by weight of a particulate graft polymer of
  A: a grafting base (A) based on
    A1: an acrylate rubber having a glass transition temperature below 0° C. the acrylate rubber consisting of
    A11: from 75 to 99.8% by weight of at least one alkyl acrylate (A11) where the alkyl radical is of 1 to 8 carbon atoms
    A12: from 0.1 to 5% by weight of at least one polyfunctional crosslinking monomer (A12) which contains at least two ethylene double bonds and is not conjugated in the 1,3-position, and
    A13: from 0.1 to 20% by weight of at least one monomer (A13) which is ethylenically unsaturated and contains a tertiary amino group in the molecule, or based on

A2: a diene rubber (A2) having a glass transition temperature below 0° C. wherein the diene rubber is obtained from conjugated diene monomers, the diene rubber consisting of
- A21: at least 50% by weight of one or more dienes (A21),
- A22: up to 50% by weight of at least one copolymerizable ethylenically unsaturated monomer (A22), and
- A23: from 0.1 to 15% by weight of at least one monomer (A23) which is ethylenically unsaturated and contains a tertiary amine group in the molecule, and B: a graft (B) of
- B1: from 40 to 89.9% by weight of at least one vinylaromatic monomer (B1),
- B2: from 10 to 49.9% by weight of at least one polar copolymerizable ethylenically unsaturated monomer (B2),
- B3: from 0.1 to 20% by weight of at least one monomer (B3) which is ethylenically unsaturated and contains carboxyl or sulfo groups, and (ii) from 50 to 90% by weight of at least one matrix polymer obtained from ethylenically unsaturated monomers, which polymer has a glass transition temperature of more than 25° C.

2. The molding material of claim 1 consisting essentially of (i) from 1–50% by weight of a particulate graft polymer of A: a grafting base (A) based on a diene rubber (A$_2$) having a glass transition temperature below 0° C. wherein the diene is obtained from conjugated diene monomer, the diene rubber consisting of
- A21: at least 50% by weight of one or more dienes (A21),
- A22: up to 50% by weight of at least one copolymerizable ethylenically unsaturated monomer (A22), and
- A23: from 0.1 to 15% by weight of at least one monomer (A23) which is ethylenically unsaturated and contains a tertiary amine group in the molecule, and B: a graft (B) of
- B1: from 40 to 89.9% by weight of at least one vinylaromatic monomer (B1),
- B2: from 10 to 49.9% by weight of at least one polar copolymerizable ethylenically unsaturated monomer (B2),
- B3: from 0.1 to 20% by weight of at least acidic monomer (B3) which is ethylenically unsaturated and contains carboxy or sulfo groups, and (ii) from 50 to 90% by weight of at least one matrix polymer obtained from ethylenically unsaturated monomers, which polymer has a glass transition temperature of more than 25° C.

* * * * *

UNITED STATES PATENT AND TRADEMARK OFFICE
CERTIFICATE OF CORRECTION

PATENT NO.: 5,344,877

DATED: September 6, 1994

INVENTOR(S): FISCHER et al.

It is certified that error appears in the above-identified patent and that said Letters Patent is hereby corrected as shown below:

Cover page, item [57], line 8 of the Abstract, "coplymerizable" should read --copolymerizable--.

Column 7, claim 1, line 24, "90%" should read --99%--.

Column 8, claim 2, line 6, "monomer" should read --monomers--.

Column 8, claim 2, line 14, "amine" should read --amino--.

Column 8, claim 2, line 22, after "least" insert --one--.

Column 8, claim 2, line 24, "carboxy" should read --carboxyl--.

Column 8, claim 2, line 25, "90%" should read --99%--.

Signed and Sealed this

Eighth Day of November, 1994

Attest:

BRUCE LEHMAN

Attesting Officer

Commissioner of Patents and Trademarks